(12) United States Patent
Rodi

(10) Patent No.: US 6,898,865 B2
(45) Date of Patent: May 31, 2005

(54) MEASURING SYSTEM FOR RECORDING ABSOLUTE ANGULAR OR POSITION VALUES

(76) Inventor: Anton Rodi, Paul-Ehrlich-Strasse 1, D-69181 Leimen (DE)

( * ) Notice: Subject to any disclaimer, the term of this patent is extended or adjusted under 35 U.S.C. 154(b) by 14 days.

(21) Appl. No.: 10/116,489

(22) Filed: Apr. 4, 2002

(65) Prior Publication Data
US 2002/0144423 A1 Oct. 10, 2002

(30) Foreign Application Priority Data
Apr. 5, 2001 (DE) .......................................... 101 17 193

(51) Int. Cl.$^7$ .............................................. D26D 7/28
(52) U.S. Cl. ............................ 33/707; 33/708; 33/706
(58) Field of Search ......................... 33/706, 707, 708, 33/761, 762, 763, 755

(56) References Cited

U.S. PATENT DOCUMENTS

| | | | | |
|---|---|---|---|---|
| 2,659,072 A | * | 11/1953 | Coales et al. ................. 33/707 |
| 2,854,753 A | * | 10/1958 | Caparros ...................... 33/762 |
| 3,029,518 A | * | 4/1962 | Raymond ...................... 33/708 |
| 3,224,323 A | * | 12/1965 | Chitayat ...................... 356/510 |
| 3,648,276 A | | 3/1972 | Schuman |
| 4,031,360 A | * | 6/1977 | Soule, Jr. ...................... 377/24 |
| 4,158,509 A | * | 6/1979 | Rieder et al. ................. 33/707 |
| 4,178,691 A | * | 12/1979 | Tateishi ...................... 33/762 |
| 4,186,490 A | * | 2/1980 | Quenot ........................ 33/762 |
| 4,366,623 A | * | 1/1983 | Bergqvist .................... 33/763 |
| 4,465,373 A | * | 8/1984 | Tamaki et al. ................. 33/707 |
| 4,512,082 A | * | 4/1985 | Burkhardt .................... 33/706 |
| 4,517,742 A | * | 5/1985 | Ernst .......................... 33/706 |
| 4,519,709 A | * | 5/1985 | Nelle .......................... 356/619 |
| 4,530,155 A | * | 7/1985 | Burkhardt et al. ............. 33/707 |
| 4,628,609 A | * | 12/1986 | Rieder et al. ................. 33/707 |
| 4,631,404 A | * | 12/1986 | Burkhardt et al. ............. 33/707 |
| 4,786,891 A | * | 11/1988 | Ueda et al. ................... 33/707 |
| 4,793,067 A | * | 12/1988 | Reimar et al. ................. 33/707 |
| 5,115,573 A | * | 5/1992 | Rieder et al. ................. 33/706 |
| 5,433,014 A | * | 7/1995 | Falk et al. ................... 33/763 |
| 5,793,201 A | * | 8/1998 | Nelle et al. .................. 33/706 |
| 5,894,678 A | * | 4/1999 | Masreliez et al. ............. 33/762 |
| 6,029,118 A | * | 2/2000 | Strasser ...................... 33/706 |
| 6,163,970 A | * | 12/2000 | Nelle et al. .................. 33/706 |

FOREIGN PATENT DOCUMENTS

| | | |
|---|---|---|
| DE | 85 21 160.5 U1 | 3/1990 |
| DE | 195 05 176 A1 | 8/1995 |
| DE | 196 21 015 C2 | 11/1997 |
| DE | 197 24 732 A1 | 12/1998 |
| DE | 198 21 558 A1 | 2/1999 |
| DE | 0 902 255 A2 | 3/1999 |
| DE | 0 995 974 A1 | 4/2000 |
| JP | 361120903 | * 6/1986 ............... 33/1 N |

* cited by examiner

Primary Examiner—Diego Gutierrez
Assistant Examiner—Travis Reis
(74) Attorney, Agent, or Firm—Laurence A. Greenber; Werner H. Stemer; Ralph E. Locher

(57) ABSTRACT

A measuring system for the recording of angular or position values wherein the scale includes a measurement track with absolute encoding, and which is scanned by a sensor is provided. The scale is composed of at least two segments with similar absolute encoding, and a parallel track is provided on the scale with which the absolute value of the particular segment reached is calculated. The total absolute value is then gained from the combination of both absolute values.

10 Claims, 2 Drawing Sheets

MEASURING SYSTEM FOR RECORDING ABSOLUTE ANGULAR OR POSITION VALUES

BACKGROUND OF THE INVENTION

Field of the Invention

The present invention relates to a measuring system for recording absolute angular or position values.

Such a measuring system, which is suitable both for angular as well as position measurements, is well known from DE 195 05 176 A1. This specification describes a linear PRC code (absolute encoding in the scale axis and one after the other in a narrow line with equal spacing of an additional incremental track) whose length is given by L=the division spacing * bit value of the absolute code. The incremental track serves the purpose of increasing the accuracy of the respective absolute value to be determined.

With a division spacing of, for example, 20 to 30 μm and a 12 bit absolute track, total lengths of 20 μm to 30 μm * 4096≅82 to 123 mm result. This maximum scale length is far too short for many purposes. If scale lengths of, for example, 4 to 5 m are to be implemented, absolute codes of more than 18 to 20 bits are needed, as indicated in DE 195 05 176 A1.

Such scales are complicated to manufacture. Moreover, the 18 to 20 photo-receivers must render the scale as distortion free as possible and this must be illuminated with light of sufficient intensity. In addition, complex signal processing is required in the evaluation electronics.

Incremental length encoders for such a scale length are versatile as regards scale design and evaluation electronics, so that they are also used for absolute measurements. To do this, one or several reference marks are necessary, which must always be approached when the system is switched on or off. The measuring device is also susceptible to loss of position, therefore this must always be taken into account by approaching the reference marks to ensure the required accuracy. This is time-consuming, not always feasible and is preferred only for cost reasons over the rarely encountered and expensive absolute measuring systems.

SUMMARY OF THE INVENTION

It is accordingly an object of the invention to provide a measuring system for recording absolute values which overcomes the above-mentioned disadvantages of the heretofore-known measuring systems of this general type and which can be used for large scale lengths, and which does not require a very large number of bits in the scale encoding with the associated disadvantages.

With the foregoing and other objects in view there is provided, in accordance with the invention, a linear measuring system for the recording of angular and position absolute values, where the scale (1) includes a measurement track (2) for generating absolute values which is recorded by an appropriate scanning head, wherein the scale (1) is composed of at least two segments (1a to 1c) which are identical created for the generation of the absolute values and wherein a parallel track (4) is provided on the scale for determining the absolute value of the particular segment reached (1a to 1c) by means of a further sensor arrangement and wherein switching means are provided which use the absolute value of the segments (1a to 1c) and the determined absolute value within the segment (1a to 1c) to provide the total absolute value for further processing.

According to another feature of the invention, the particular segments (1a to 1c) are designed with the same code sections.

According to another feature of the invention, the parallel track (4) is designed for magnetic signal recording.

According to another feature of the invention, the parallel track (4) contains permanent magnetic segments.

According to another feature of the invention, an auxiliary power battery outside and/or inside the further sensor is provided for emergency supply.

According to another feature of the invention, it includes at least two identical and staggered sensors ($S_1$, $S_2$) whose measured values are used for redundant signal evaluation by the external control system.

According to another feature of the invention, the absolute measuring system is based on optical, magnetic, inductive, electromagnetic or capacitive measuring systems or a combination thereof.

According to another feature of the invention, the absolute value of the segment reached (1a to 1c) is determined by logical evaluation of the traversed segments (1a to 1c) from a defined starting position.

The linear scale in accordance with the invention may be produced at a reasonable cost for any length of linear measurement and is simple to use. The complete scanning sensor's components are suitable for universal application in angular and position measuring systems and can be used for any lengths of measurement. The design of the linear measuring device in accordance with the invention takes account of the wide range of requirements and produces a universal and cost-effective device design for even the most diverse of tasks.

The idea behind the invention is to use, for example, 12 bit absolute encoded segments, which for optical scanning systems are about 100 mm in length, and a plurality thereof arranged in sequence produce the length of the scale. Advantageously these segments contain an absolute encoded track, preferably equipped with an additional incremental track running parallel for analog recording of the path in between, in order to produce a total absolute value of very high resolution. A 4 m scale contains approximately 40 such identical absolute encoded segments, for example, in PRC code, the code design for the beginnings and ends of which is taken into account for the continuous signal evaluation. A 12-bit code, for example, will result in 144 possible encodings, after which a cyclic transition to the next segment can take place.

In order to determine the absolute position as a whole, it is necessary to record the "number" of the particular segment. In accordance with the invention, this is done by recording the segments according to direction and position, and then identifying them logically from a defined starting position. In accordance with the invention there is, in addition to the absolute encoded segments, a track, which permits the recording of the segments in 4 sections by interacting with, for example in its simplest design, two switch sensors, thus clearly determining the position even for extremely high process speeds. In its simplest type the track is provided with a symmetrical dark/light track for optical systems, or, for magnetic scanning, with a structure having approximately 50% of the sections magnetic and non-magnetic, and is advantageously staggered by 25% of the segments at the beginning and end of the encoded track, respectively. It is recommended to record the track magnetically which, by means of a permanent magnet, can provide the auxiliary power for the sensors used for this purpose, and which favors battery operation for signal processing and data storage due to the minimal power consumption. This detection system is also very robust and resistant to dirt. The auxiliary power battery is required to store the absolute value of the segment, to enable secure recording of position immediately after switching on the supply voltage 12. This also guarantees the correct absolute value of the segment when the mains power 12 is switched on again, if the movable device is adjusted by hand when there is no mains power. The individual segments and their numbers are co-recorded as absolute values on the parallel track and thus create the absolute value when the equipment is switched on again.

The absolute value generation in each particular segment achieved in this way—quite independent of the selected process used for absolute value generation—is supplemented by means of the countable recording of segments to form the total absolute value for any length of scale. The sensor components including signal processing are housed in the complete sensor. They are the same for a plurality of angular and position measuring systems and are therefore versatile in use. The scale can be created in "endless length", the required lengths of scale can simply be separated from it. Advantageously, the data exchange and parameterizing interfaces are also designed identical to those of the rotary and angular position encoders, in order to ensure the advantageous end-to-end integration of the sensor systems in customer control systems with respect to start-up, use and service. Fully digital versions via SSI data exchange and parameterizing are especially advantageous in this respect. Encoder systems, under real-time signal processing in particular, offer redundant sensor evaluation via parallel retrievable SSI pulse signals on several encoders—each with a separate data line—and may also be used in a linear measuring system in a very dirty environment (both for the sensor and for the scale).

Other features which are considered as characteristic for the invention are set forth in the appended claims.

Although the invention is illustrated and described herein as embodied in a linear measuring system for the recording of angular and position absolute values, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
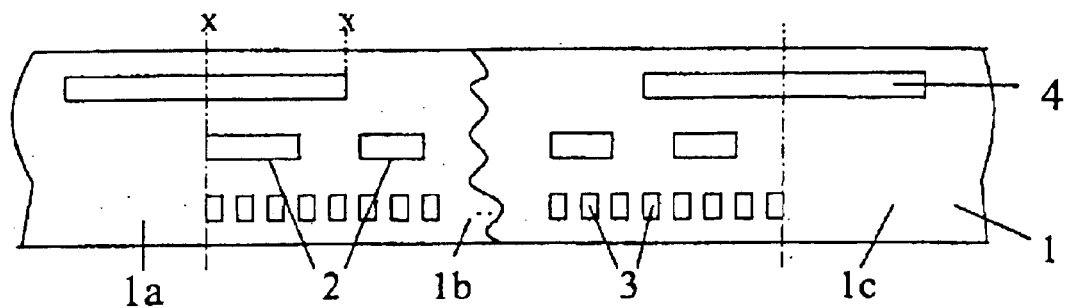
FIG. 1 shows the structure of the scale.

Referring now to the figures of the drawings in detail and first, particularly, to FIG. 1 thereof, there is shown a part of a scale 1 which is provided with a track 2 encoded with, for example, 12-bit absolute values. This means that the appropriate scanning head comprises an array of twelve scanning cells, each of which recognize a new absolute value after a movement of one increment. Three segments 1a to 1c are shown here, whereby only an extract of the central segment 1b can be seen. In one segment there are $2^{12}$=4096 distinct increments present, for example in PRC code. The total scale is made up of several segments 1a to 1c. An incremental track 3 is positioned below track 2, and is used to increase the accuracy of each of the particular values of the absolute track 2; it has the same total length as the scale.

In addition to the said tracks according to the invention there is a further track 4 of the same length as the segments, which is used to recognize and record the segments and is based on a defined starting position to logically determine the direction and position of the segments. Thus the "number" of individual segments can therefore be determined. In its simplest form, the track is equipped with a symmetrical dark/light track for optical systems, or, for a track with magnetic evaluation, with 50% of the segments having either a magnetic or non-magnetic structure. It is important that at the transitional points from one segment to another, for example from 1a to 1b, a magnetic structure is present and is located staggered by approximately 25% of the segments. This is shown in FIG. 1 where, for the purposes of track 4, it may be assumed that segment 1b is shown in its entirety. Only by doing this can it be shown that 50% of the track is magnetic and 50% non magnetic. The track is scanned with, for example, two switch sensors, to determine clearly the point of transition. The switch sensors are positioned advantageously at a distance of approximately 25% of the segment. This allows recording of the 4 quadrants of the segments marked, for example with an x in FIG. 1, (2 times 25% magnetic, 2 times 25% non-magnetic), at approximately 2 m/sec, even at a very high measuring speed of, for example, 10 m/sec., which is certainly sufficient even for slow sensors such as Reed switches or pulsed magnetic sensors. This is important for the evaluation of the segments to be counted under all sorts of on/off switching operations of the supply voltage and for the logical composition of the absolute value using the segments and necessitates careful design. It is not intended to further explain here that higher sensor switch speeds would allow them to be located at much smaller distances than 25% of the segment, for example in an integrated module. Hence, the actual position is calculated from the absolute value of track 2, enhanced possibly by track 3, and the determination of the "numbers" of segments with track 4.

Figure 2:
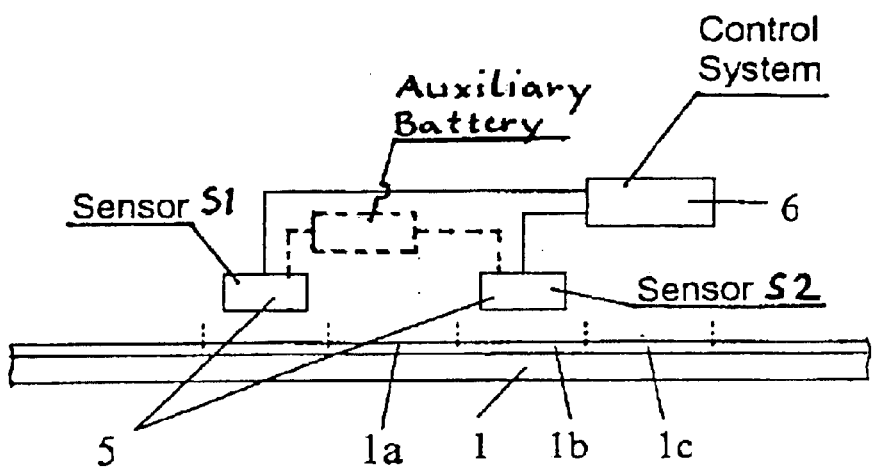
FIG. 2 shows the scale with sensors.

FIG. 2 shows a side view of scale 1 with a number of segments, for example 1a to 1c. There are two staggered sensor arrangements 5, whose measurement results are used for a redundant signal evaluation and are processed accordingly in the control system 6.

Figure 3:
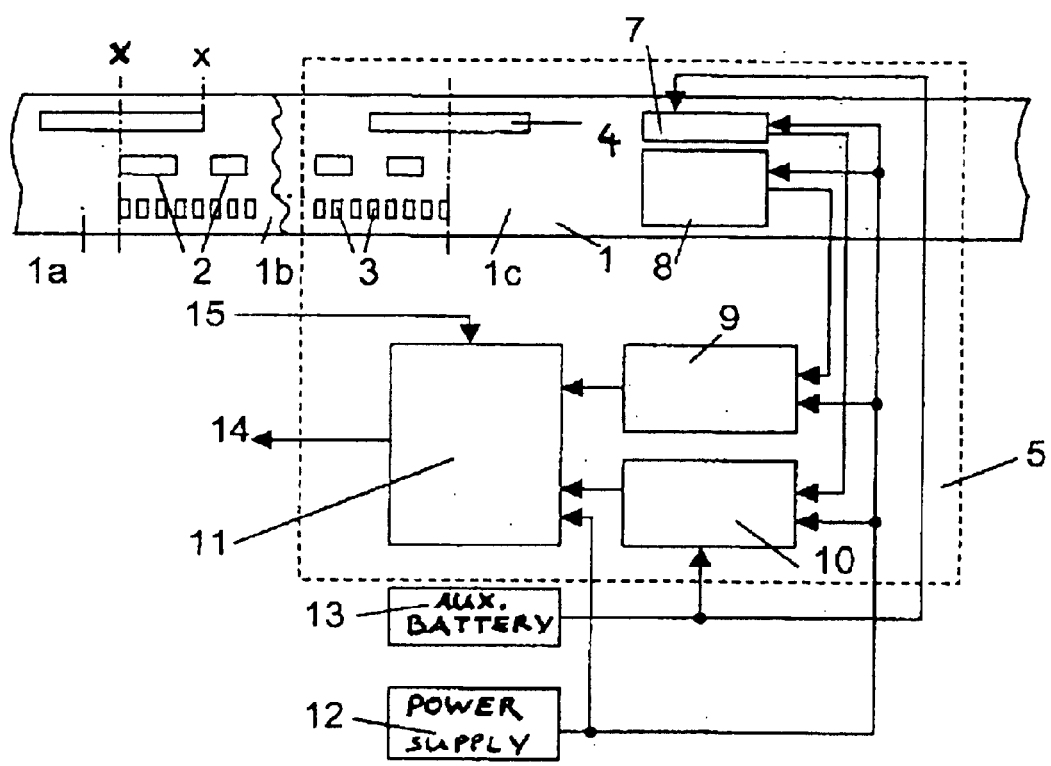
FIG. 3 is diagrammatic view of the measuring system according to the invention.

FIG. 3 shows the scale 1 with the sensor components and an exemplary signal processing, which includes the sensor 5. The further sensor arrangement 7 is supplied, together with the associated switching means 10 of the absolute values of the segments, from the mains power 12 as well as from an auxiliary power 13, such as a battery, such that during a mains disconnection the function is maintained and no segment measurement values are lost.

The measurement track 2, 3 detected by the scanning head 8 results in the generation of the absolute values 9 within the segments and needs only function when mains-power is provided. The two absolute values 9 and 10 are consequently used for generating the total absolute value 11 which is provided by 14 for further processing wherein the defined starting position 15 are taken into account.

I claim:

1. A linear measuring system comprising:
a scale including at least two segments identically created for the generation of absolute values, each of said at least two segments comprising a measurement track for generating the absolute value within the segments being recorded by a scanning head, and a parallel track for determining the absolute value of the particular segment reached by a sensor arrangement; and a switching device using the generated absolute value within the segments and the determined absolute value of the segment for providing the total absolute value.

2. The measuring system according to claim 1, wherein the particular segments are constructed with the same code sections.

3. The measuring system according to claim 1, wherein the parallel track is constructed for magnetic signal recording.

4. The measuring system according to claim 3, wherein the parallel track contains permanent magnetic segments.

5. The measuring system according to claim 1, wherein an auxiliary power battery outside and/or inside the further sensor is provided for emergency supply.

6. The measuring system according to claim 1, wherein the absolute measuring system comprises at least two identical and staggered sensors whose measured values are used for redundant signal evaluation by the external control system.

7. The measuring system according to claim 1, wherein the absolute measuring system is based on optical, magnetic, inductive, electromagnetic or capacitive measuring systems or a combination thereof.

8. The measuring system according to claim 1, wherein the absolute value of the segment reached is determined by logical evaluation of the traversed segments from a defined starting position.

9. The measuring system according to claim 1, wherein the absolute value of the segments and the determined absolute value within the segment are linear values.

10. The measuring system according to claim 1, wherein the absolute value of the segments and the determined absolute value within the segment are angular values.

* * * * *